W. SCHWIER

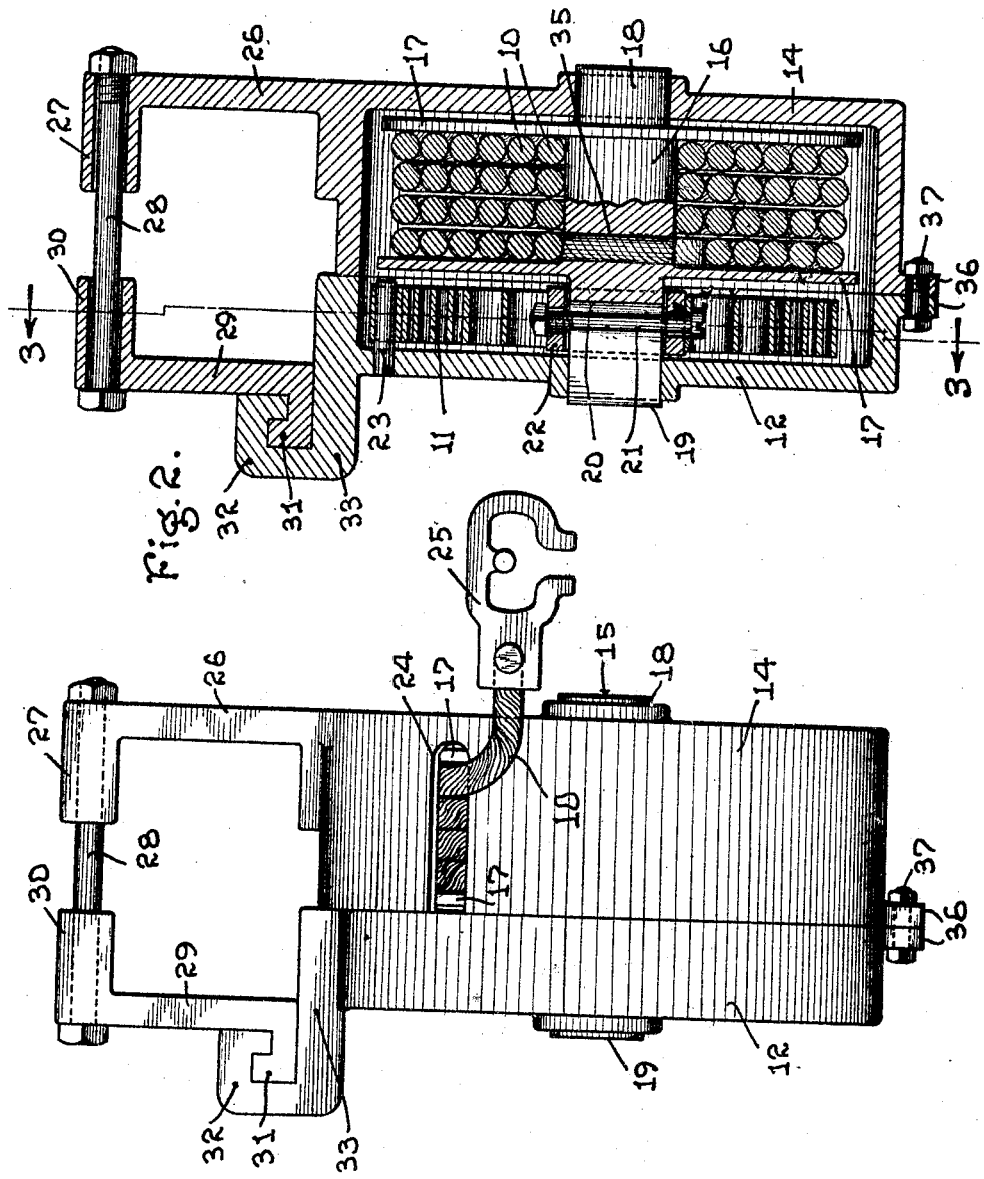
June 1, 1926.
W. SCHWIER
TOWLINE
Filed March 19, 1925 2 Sheets-Sheet 1
1,587,426
Inventor
WILLIAM SCHWIER.
By E. Hume Talbert
Attorney June 1, 1926.

TOWLINE

Filed March 19. 1925

Inventor
WILLIAM SCHWIER
By Elmer Talbert
Attorney

Patented June 1, 1926.

1,587,426

UNITED STATES PATENT OFFICE.

WILLIAM SCHWIER, OF LOS ANGELES, CALIFORNIA, ASSIGNOR OF ONE-HALF TO LEE B. COATS, OF LOS ANGELES, CALIFORNIA.

TOWLINE.

Application filed March 19, 1925. Serial No. 16,757.

The object of the invention is to provide a device adapted for use as a permanent or fixed attachment to an auto vehicle as emergency equipment so that, in the event of the machine equipped being disabled, ready means may be provided for connection to a towing machine; to provide an emergency device of this character in which the slack of the towing cable may be automatically cared for to prevent the cable dragging on the ground and possibly engaging some obstruction thereon in the event of the machine at intervals acquiring a greater speed than the towing machine; and to provide a device of this nature in which the construction is comparatively simple and therefore susceptible of being produced at small expense and marketed at small cost.

With this object in view, the invention consists in a construction and combination of parts of which a preferred embodiment is illustrated in the accompanying drawings, wherein:

Figure 1 is a front elevational view of the device.

Figure 2 is a central transverse vertical sectional view through the same.

Figure 3:
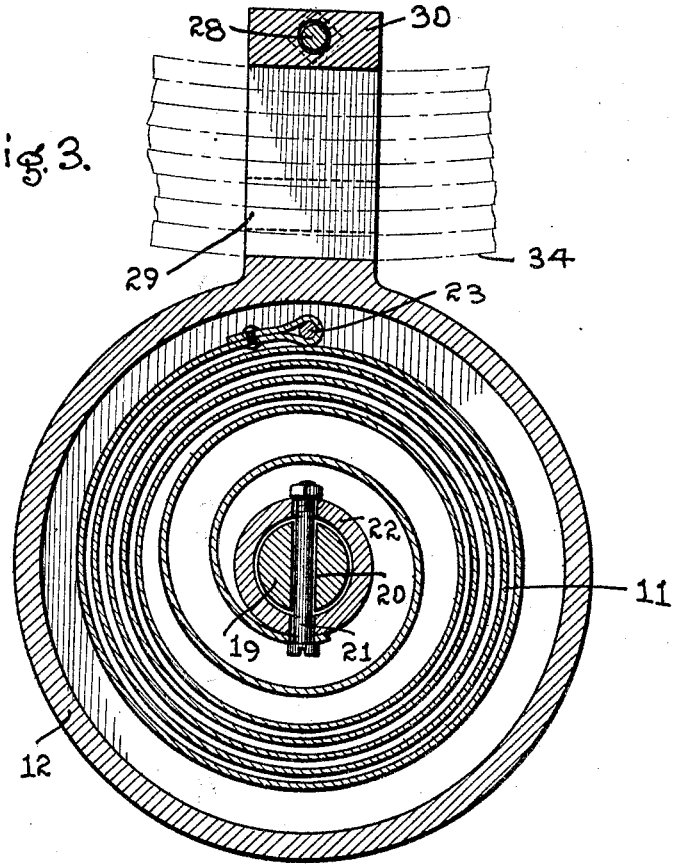
Figure 3 is a vertical elevational view on the plane indicated by the line 3—3 of Figure 2.
Figure 4:
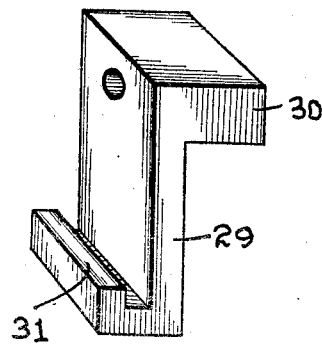
Figure 4 is a detail perspective view of the detachable clamping element constituting an element of the means for securing the device to the vehicle.

Both the tow line 10 and the slack take-up and reel actuating spring 11 are housed in a casing consisting of the complemental sections 12 and 14, the tow line being carried on a reel of which the shaft 15 is preferably formed as an integral part of the hub 16 with which the side flanges 17 of the reel are also preferably made integral. Obviously, however, the reel may be made separate from the shaft and secured thereto by any appropriate attaching means.

The section 14 of the casing houses the reel and the cable and is provided with a side bearing eye for the journal portion 18 of the shaft, while the section 12 houses the spring 11 and is provided with a side bearing eye for the journal portion 19 of the shaft, this journal portion, however, being slotted axially, as indicated at 20, to provide a recess for the bolt 21 by means of which one extremity of the spring is fixed with relation to the shaft. One terminal of the spring 11 is connected to the bolt and the latter passes diametrically through a collar 22 disposed in surrounding relation to the shaft between one flange 17 of the reel and the adjacent side wall of the casing.

The remote extremity of the spring is anchored, as by a loop and pin connection 23, to the wall of the section 12 of the casing. The peripheral wall of the casing is slotted, as indicated at 24, to provide a feed opening for the cable or tow line 10, the latter being provided with a grapple 25 at its free extremity for connection with a part of the towing vehicle.

While the device is designed especially as a means by which the vehicle carrying it may be towed, it is also adapted as an emergency device for towing a disabled vehicle when the vehicle equipped with it is called upon to do the towing. Depending on its use, it is attached either at the forward or the rear end of the equipped vehicle and preferably to the spring of the latter. To this end, the section 14 of the casing is provided with an upstanding ear 26 made preferably integral with the casing section and provided with a lateral sleeve extension 27 through which the attached bolt 28 may pass. The ear 26 and sleeve 27 constitute one of a pair of complemental clamping elements of which the other is carried by the section 12 of the casing but is disengageable therefrom to permit the selective use of different elements where the varying widths of springs are encountered.

The said complemental element consists of a plate 29 formed with a sleeve portion 30 through which the bolt 28 also passes. The lower end of the plate 29 is formed with a transversely J-shaped lower portion 31 for interlocking engagement with a correspondingly shaped but inverted portion 32 upstanding on a lateral plate portion 33 formed as an integral part of the section 12 of the casing. The clamping element comprising the plate 29 is engageable with or disengageable from the section 12 of the casing by a movement transverse to the axis of the bolt 28 and therefore, when the latter is attached, disengagement of this clamping element from its connected section of the casing is not possible.

By the selection of a clamping element having a plate portion 29 of the proper thickness, the desired spacing of the two complemental clamping elements may be secured to suit the width of the spring in hand, clamping elements having different thicknesses for the plate portion 29 being part of the equipment of the device. Since the sleeve portions 27 and 30 of the complemental clamping elements are directed toward each other, the clamping element interlocked with the section 12 of the casing is not attached until after the casing is positioned with the sleeve portion 27 of the plate 26 disposed in overhanging relation to the spring 34, as indicated in dotted lines in Figure 3. Thereafter, the clamping element having the sleeve 30 is disposed beside the spring with the sleeve overhanging the latter and then slid into place with the J-shaped portion 31 interlocking with the corresponding portion 32 of the section 12. The final operation is the attachment of the bolt 28 and when the nut of the latter is firmly screwed home, the device is rigidly attached to the spring of the vehicle, and it may be either the forward or rear spring, depending on whether the device is attached to be used as a means for towing disabled vehicles or to be used as a means to permit the vehicle so equipped, when disabled, to be towed by another machine.

When the tow line is not in use, it will be wound on the reel by the spring 11, but when in use it is unwound from the reel by the pull imposed in the towing operation. Should the speed of the towing and towed vehicles vary so that a slack would ordinarily be produced in the tow line or cable, the spring will immediately function to take up this slack.

The preferable means of anchoring the tow line to the reel consists in inserting the extremity of the line or cable through a transverse or diametrical hole or eye in the hub 16, as shown at 35.

As a means for securing the sections of the casing together, the latter are provided with ears 36 formed with eyes through which the securing bolt 37 passes. The ears 36 are disposed at a diametrically opposite point from the spring engaging clamp but the securing bolt 37 and the clamp bolt 28 function together as a means for holding the elements of the casing in proper relation.

The slot 20 in the journal portion 19 of the shaft 15 makes for the easy connection of the shaft with the spring in the assembling of the device and for the ready dismantling of the device and the tensioning of the spring to secure the desired torque on the reel to wind up the tow line under all conditions.

The invention having been described, what is claimed as new and useful is:

1. A device for the purpose indicated comprising a spring-actuated reel and a tow line wound thereon, a casing housing the reel, and a clamp carried by the casing for securing the same to a part of a vehicle, said clamp consisting of complemental members of which one is formed as an integral part of the casing and the other has a detachable interlocking connection with the casing.

2. A device for the purpose indicated comprising a casing consisting of complemental sections and means for securing them together, a reel carrying a tow line and housed by one of the sections and having a shaft journaled in both sections, a spring housed by the other section of the casing and terminally connected with the latter and with the shaft, and a clamp carried by the casing for connecting the latter to a part of a vehicle.

3. A device for the purpose indicated comprising a casing, a reel having a shaft journaled in the side walls of the casing and being axially slotted at one end, a spring housed by the casing and terminally secured thereto, a collar in surrounding relation to the slotted portion of the shaft, a bolt passing diametrically through the collar and through the slot in the shaft, the spring having a terminal connection with the bolt, and a clamp carried by the casing for securing the latter to a part of the vehicle.

4. A device for the purpose indicated comprising a spring-actuated reel and a housing enclosing the same, a tow line wound on the reel and extended through an opening formed in the casing, and a clamp carried by the casing for connecting the latter to the spring of a vehicle, said clamp comprising complemental members of which one is formed as an integral part of the casing and the other provided with a transversely J-shaped portion interlocking with the correspondingly shaped portion integrally formed with the casing, and a bolt engaging the elements of the clamp.

5. A device for the purpose indicated comprising a spring-actuated reel and a housing enclosing the same, a tow line wound on the reel and extended through an opening formed in the casing, and a clamp carried by the casing for connecting the latter to the spring of a vehicle, said clamp comprising complemental members of which one is formed as an integral part of the casing and the other provided with a transversely J-shaped portion interlocking with the correspondingly shaped portion integrally formed with the casing, and a bolt engaging the elements of the clamp, said clamp elements being provided with sleeve portions disposed in overhanging relation to the vehicle spring when the device is attached thereto.

In testimony whereof he affixes his signature.

WILLIAM SCHWIER.